US012496834B2

(12) United States Patent
Escudero Gonzalez et al.

(10) Patent No.: US 12,496,834 B2
(45) Date of Patent: Dec. 16, 2025

(54) HIGH STABILITY INK DELIVERY SYSTEMS, AND ASSOCIATED PRINT SYSTEMS AND METHODS

(71) Applicant: ELECTRONICS FOR IMAGING, INC., Londonderry, NH (US)

(72) Inventors: Juan Escudero Gonzalez, Almazora (ES); Eduardo Bueno Espinal, Almazora (ES)

(73) Assignee: ELECTRONICS FOR IMAGING, INC., Londonderry, NH (US)

(*) Notice: Subject to any disclaimer, the term of this patent is extended or adjusted under 35 U.S.C. 154(b) by 0 days.

(21) Appl. No.: 18/434,067

(22) Filed: Feb. 6, 2024

(65) Prior Publication Data

US 2024/0173989 A1 May 30, 2024

Related U.S. Application Data

(60) Division of application No. 17/227,648, filed on Apr. 12, 2021, now Pat. No. 11,970,009, which is a continuation of application No. 16/162,077, filed on Oct. 16, 2018, now Pat. No. 10,974,517.

(51) Int. Cl.
*B41J 2/17* (2006.01)
*B41J 2/175* (2006.01)

(52) U.S. Cl.
CPC .................................. *B41J 2/17566* (2013.01)

(58) Field of Classification Search
CPC ...... B41J 2/17556; B41J 2/17596; B41J 2/18; B41J 2/175; B41J 2/19
See application file for complete search history.

(56) References Cited

U.S. PATENT DOCUMENTS 4,314,264 A 2/1982 Bok et al.
4,929,963 A 5/1990 Balazar
5,646,666 A 7/1997 Cowger et al.
5,880,748 A 3/1999 Childers et al.
5,969,735 A 10/1999 Haigo
6,030,074 A 2/2000 Barinaga
6,139,136 A 10/2000 Mackay et al.
6,315,402 B1 11/2001 Kawase
6,428,156 B1 8/2002 Waller et al.
6,631,983 B2 10/2003 Romano et al.
(Continued)

FOREIGN PATENT DOCUMENTS

CN 101903181 A 12/2010
CN 104040297 A 9/2014
(Continued)

OTHER PUBLICATIONS

Wouters, Machine TranslationofES-2350699-T3, 2011 (Year: 2011).*

*Primary Examiner* — Scott A Richmond
(74) *Attorney, Agent, or Firm* — PERKINS COIE LLP

(57) ABSTRACT

Disclosed are high stability ink delivery system systems and methods for their use, in which a secondary reservoir is placed upstream of a printhead. The secondary reservoir can be opened to the atmosphere through a valve, such as based on the reading of a pressure sensor placed at a point before the printhead. The purpose of this valve is to open the secondary reservoir to the atmosphere when the pressure sensor indicates that the secondary reservoir can be open while avoiding air aspiration, and closing it when this condition is not satisfied.

13 Claims, 8 Drawing Sheets

(56) References Cited

U.S. PATENT DOCUMENTS

| | | | | |
|---|---|---|---|---|
| 7,874,656 | B2 | 1/2011 | Ota et al. | |
| 8,109,596 | B2 | 2/2012 | Karppinen | |
| 8,491,075 | B2 | 7/2013 | Zhou et al. | |
| 8,926,077 | B2 | 1/2015 | Lacaze et al. | |
| 8,991,986 | B2 | 3/2015 | Sowinski et al. | |
| 2006/0158481 | A1 | 7/2006 | Spevak et al. | |
| 2006/0209115 | A1 | 9/2006 | Espasa et al. | |
| 2010/0073439 | A1 * | 3/2010 | Wouters | B41J 2/17556 347/85 |
| 2013/0208038 | A1 | 8/2013 | Isozaki et al. | |
| 2014/0015903 | A1 | 1/2014 | Gengrinovich et al. | |
| 2014/0240406 | A1 | 8/2014 | Lacaze et al. | |
| 2015/0375520 | A1 | 12/2015 | Arimoto | |
| 2016/0001568 | A1 * | 1/2016 | Kamei | B41J 2/17596 347/85 |
| 2016/0250847 | A1 * | 9/2016 | Gengrinovich | B41J 2/14 347/14 |

FOREIGN PATENT DOCUMENTS

| | | | | |
|---|---|---|---|---|
| ES | 2350699 | T3 * | 1/2011 | B41J 2/1707 |
| JP | 2005231351 | A | 9/2005 | |
| WO | 2009081110 | A1 | 7/2009 | |
| WO | 2010138156 | A1 | 12/2010 | |
| WO | 2013078293 | A1 | 5/2013 | |

* cited by examiner

HIGH STABILITY INK DELIVERY SYSTEMS, AND ASSOCIATED PRINT SYSTEMS AND METHODS

CROSS-REFERENCE TO RELATED APPLICATION

This application is a divisional of U.S. patent application Ser. No. 17/227,648, filed on Apr. 12, 2021, which is a continuation of U.S. patent application Ser. No. 16/162,077, filed on Oct. 16, 2018, now U.S. Pat. No. 10,974,517, which are each incorporated herein by reference in their entireties.

FIELD OF THE INVENTION

At least one embodiment of the present invention pertains to an inkjet printing ink delivery system. More specifically, at least one embodiment of the present invention pertains to a high stability ink delivery system for an inkjet printing system.

BACKGROUND

Ink delivery systems have as main tasks delivering ink to printheads, ensuring that the conditions at the printhead nozzles are the desired ones for the drop ejection process, compensating the perturbations induced by the ink discharge, and ensuring the long-term robust performance of the printheads. With scanning or multi-pass printers, the robustness issue is not as critical because the multiple passes minimize the chance of apparition of printing defects in the final image.

For single-pass printing applications, system robustness is critical, because any printing defect will be present in the final product. In these applications, improved robustness has been traditionally sought by inducing a continuous flow of ink through the printheads, such as to prevent temporal or permanent nozzle obstruction induced by foreign particles or air bubbles. Due to the different requirements of different printing platforms and applications, such ink delivery systems have evolved into different configurations that aim to give the best balance in terms of performance, robustness, complexity and cost.

To allow closure of the hydraulic system, the number of actuators in the ink delivery system should be at least equal to the number of variables to be controlled. In a non-recirculating ink delivery system, the pressure at the printhead nozzles, also called meniscus pressure, must be controlled, to control the drop ejection process. A basic method to achieve this is through the use of a closed pressurized reservoir. However, such systems are very rigid, because they do not allow to change the meniscus pressure, and often require frequent replacement of reservoirs or cartridges.

Alternatives or variations to such basic systems include configurations in which the meniscus pressure can be changed, based on hydrostatic pressure, through the use of multiple interconnected reservoirs. In some such embodiments, a pump is configured to set the air pressure within the ink reservoir and, consequently, the meniscus pressure. In some alternate systems, a mechanically movable ink reservoir allows for the control of meniscus pressure by changing its vertical position with respect to the printhead. In other configurations, a siphon is connected to the supply manifold, in which the atmosphere is employed, to prevent ink exhaust.

In industrial printers, where single-pass printing is preferred due to its higher productivity, the use of ink recirculation is commonly used. A simple configuration to achieve ink recirculation can be achieved by modifying a hydrostatic-based non-recirculating ink delivery system, to include an ink return path. Such a system can be based on two tanks that are open to atmosphere, where the height difference between them, and the height of the ink free surface, defines the recirculation flow rate and the meniscus pressure. While such a system is intrinsically very rigid as these parameters cannot be adjusted, the system may include the abovementioned enhancements. For example, in some such systems, a valve can be placed upstream of the printheads, to control the meniscus pressure, while in other such systems, the control of meniscus pressure is achieved by using a pump downstream of the printheads.

Nevertheless, in industrial applications, it is preferred to be able to independently set the meniscus pressure and the recirculation flow rate, to decouple the requirements in terms of drop jetting and robustness, so at least two actuators are needed. Two main philosophies can be followed to achieve this:

- using a first approach, amplifying the hydrostatic-based ink delivery system with two actuators, to define a pressure within a reservoir different than the atmospheric one, thus allowing control of the meniscus pressure and flow rate independently; or
- using a second approach, configuring a system without secondary reservoirs, while using two pumps to independently set these variables.

In principle, the first approach has better stability, due to its reliance on hydrostatic pressure, but also becomes more costly and complex compared to the second approach, due to the higher number of actuators that have to be integrated. The decision about which such approach to choose becomes of paramount importance for the cost of the machine, its complexity and operational cost and the design requirements that have to be imposed to the associated subsystems, like the electronic control system, particularly when combined with high discharge printheads.

Some current single-pass printers include an ink delivery system having two pumps: one (filling pump) placed before the printheads, and another (meniscus pump) placed after the printheads. These two pumps or actuators allow to independently control the flow rate through the printheads and the meniscus pressure, to improve the robustness of the system for single-pass printing applications, without affecting the drop ejection process.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here are techniques that can be used to improve stability for ink delivery systems, particularly for high discharge applications, such as under conditions in which the volume of ink that is jetted through the printheads is comparable to the volume of ink that is otherwise recirculated through the system, when the system is not printing.

Various exemplary embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below. However, any terminology intended to be interpreted in any restricted manner will be overtly and specifically defined as such.

A common problem in current printing systems is the stability of the ink delivery system in high discharge applications. In such applications, the volume of ink that is jetted through the printheads is comparable to the volume of ink that is being recirculated through the system when it is not printing. The severity of the perturbation induced by the sudden discharge of ink through the printheads can impose stringent constraints on the dynamics of the system, which can include the hydraulic circuit, the actuators or pumps, and their respective control electronic systems.

Certain embodiments of the high stability ink delivery system disclosed herein are configured to prevent the pressure at the printhead nozzles, i.e., the meniscus pressure, to reach a value outside of the operating window, such as to prevent conditions such as uncontrolled drop formation, i.e., dripping, and/or ink starvation.

Figure 1:
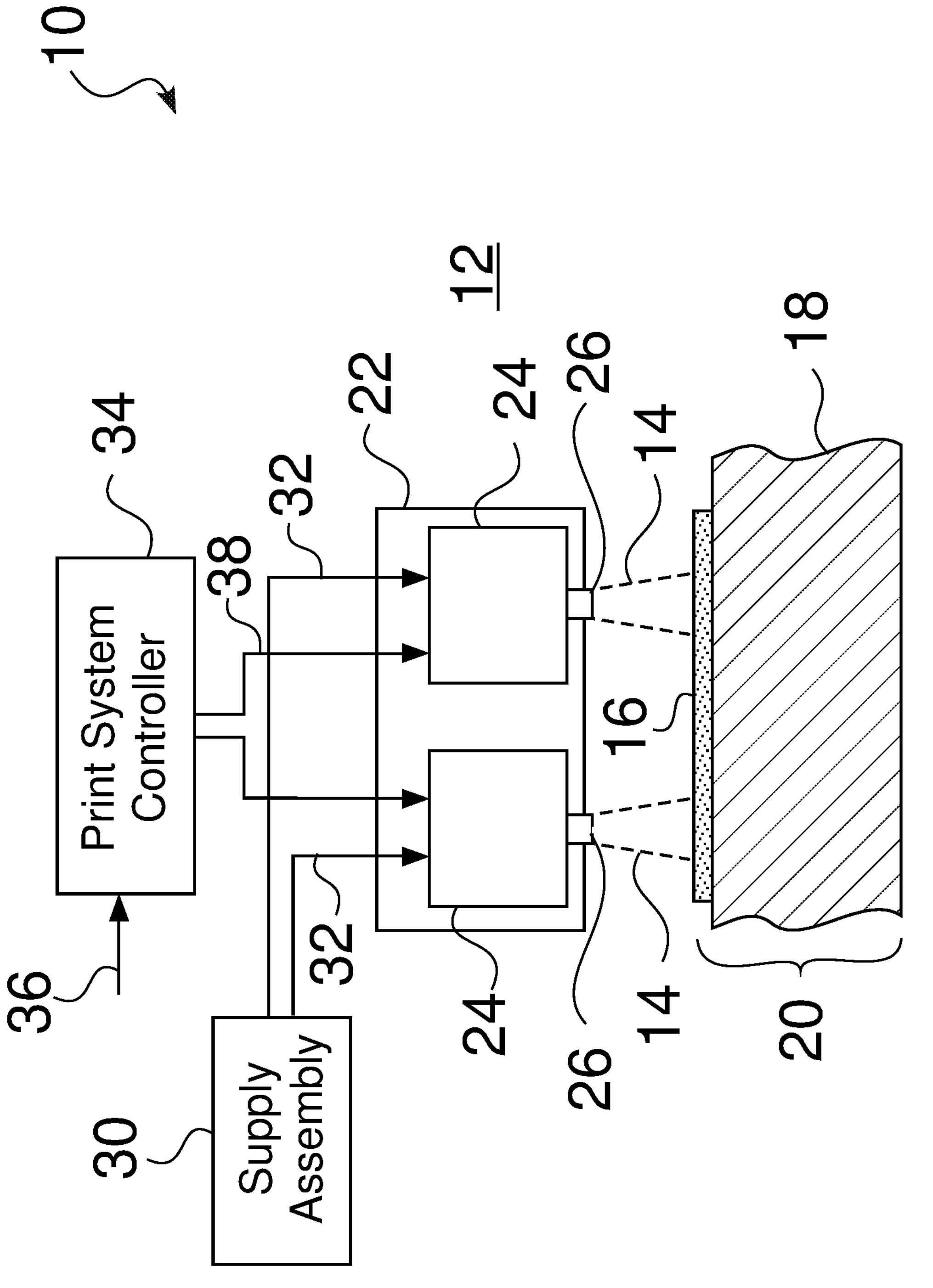
FIG. 1 is a simplified schematic diagram of an illustrative printing system, including an ink delivery system, for jetting an inkjet ink onto a workpiece or substrate.

FIG. 1 is a simplified schematic diagram 10 of an illustrative printing system 12 for jetting 14 an inkjet ink 16 onto a workpiece or substrate 18, such as to form a work product 20, e.g., printed matter 20. In some embodiments, the inkjet ink 16 comprises any of a coating or a varnish. In some embodiments the inkjet ink can be used for texturing and/or additive manufacturing. The illustrative printing system 12 seen in FIG. 1 includes a printhead assembly 22, including one or more printheads 24 having corresponding jets 26. A supply assembly 30 is connected to the printheads 24, through an ink delivery system 32, whereby the inkjet ink 16 can be transferred to the printheads 24, for jetting 14 onto a substrate 18, such as controlled 38 by a print system controller 32, typically in response to a received print job 34. In operation, the printing system 12 allows precise control 38 over the location of the jetted inkjet ink 16.

Figure 2:
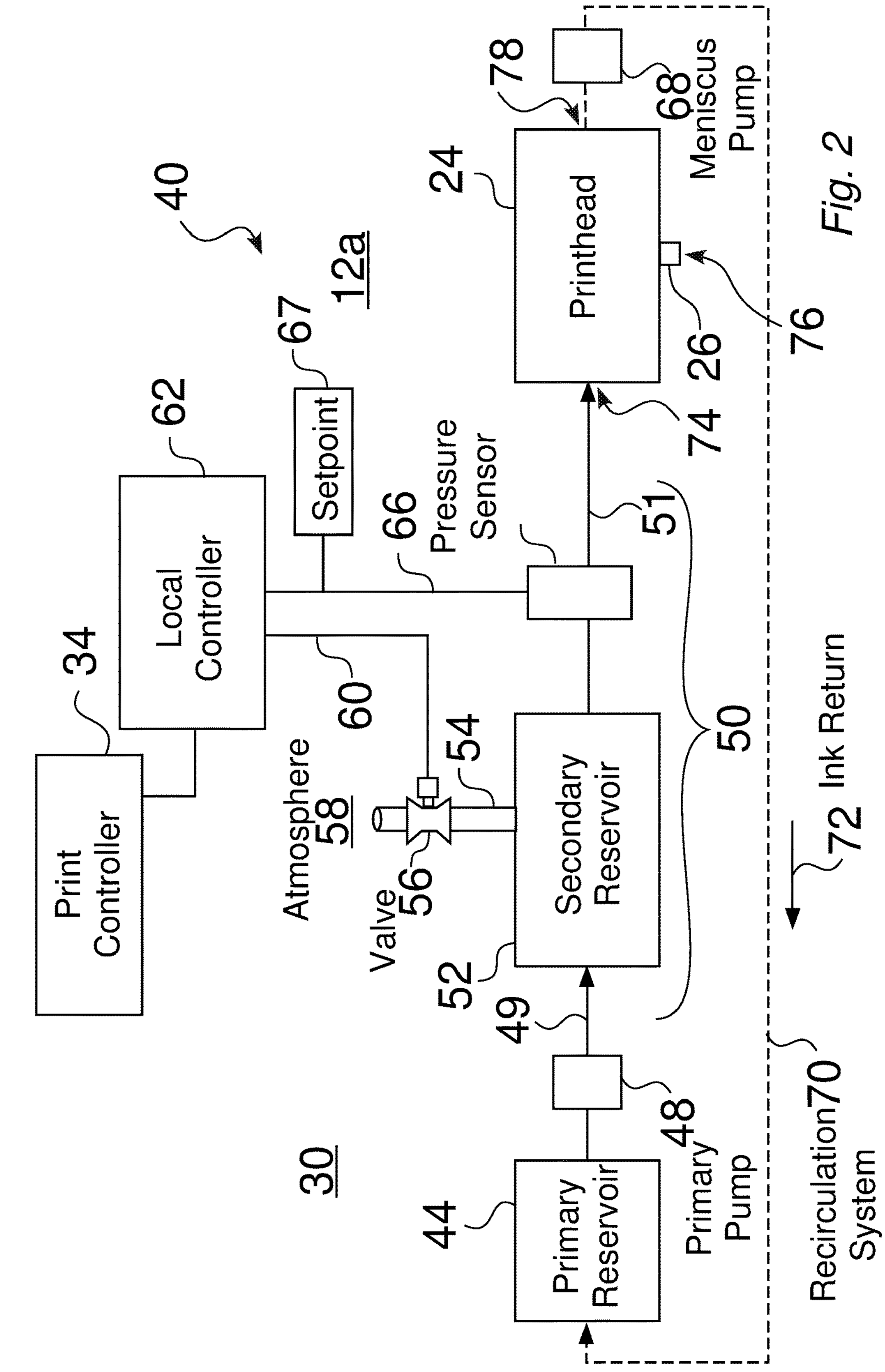
FIG. 2 is a schematic diagram of an illustrative embodiment of an inkjet ink delivery system that includes a secondary reservoir placed upstream of the printhead, which can be controllably opened to the atmosphere.

FIG. 2 is a detailed schematic diagram 40 of an illustrative embodiment of an high stability ink delivery system 50 that includes a secondary ink reservoir 52 placed upstream of a corresponding printhead 24, in which the secondary ink reservoir 52 can controllably be opened to the atmosphere 58, such as through a conduit 54 having a valve 56, in which the valve 56 can be opened or closed, based on the output 66 of a pressure sensor 64 placed at a point on an ink delivery line, i.e., conduit 51 before the printhead 24, e.g., before or proximate to a printhead inlet port 74.

The illustrative print system 12*a* seen in FIG. 2 can include a primary pump or actuator 48, such as located on an ink delivery conduit 49 between the primary ink reservoir 44 and the secondary ink reservoir 52. As well, in some embodiments, the illustrative print system 12*a* seen in FIG. 2 can include an ink recirculation system 70, such as for high output and/or industrial applications, in which ink delivered to the printheads 64 that is not currently jetted 14 can flow 72, such as through a printhead outlet port 78, and back to the primary reservoir 44, to be recirculated back through the printing system 12*b*. The illustrative ink recirculation system 70 seen in FIG. 2 can also include a secondary meniscus pump 68, such as to control the meniscus pressure 76 at the corresponding jets 26.

As further seen in FIG. 2, the valve 56 can be controlled by a signal 60, such as received by a local controller 62 or by the print system controller 34. The control signal 60, which can be used to open or close the valve 56, can be based on a setpoint or threshold 67, such as when compared to the output 66, i.e., signifying the pressure in ink delivery conduit 51, as measured by the pressure sensor 64. In operation, the high stability ink delivery system 50 can be configured to dynamically receive 304 (FIG. 7) the measured pressure output 66, compare 306 (FIG. 7) the output 66 with the setpoint or threshold 67, and control 308 (FIG. 7) the valve 56, based on the comparison 306.

Figure 3:
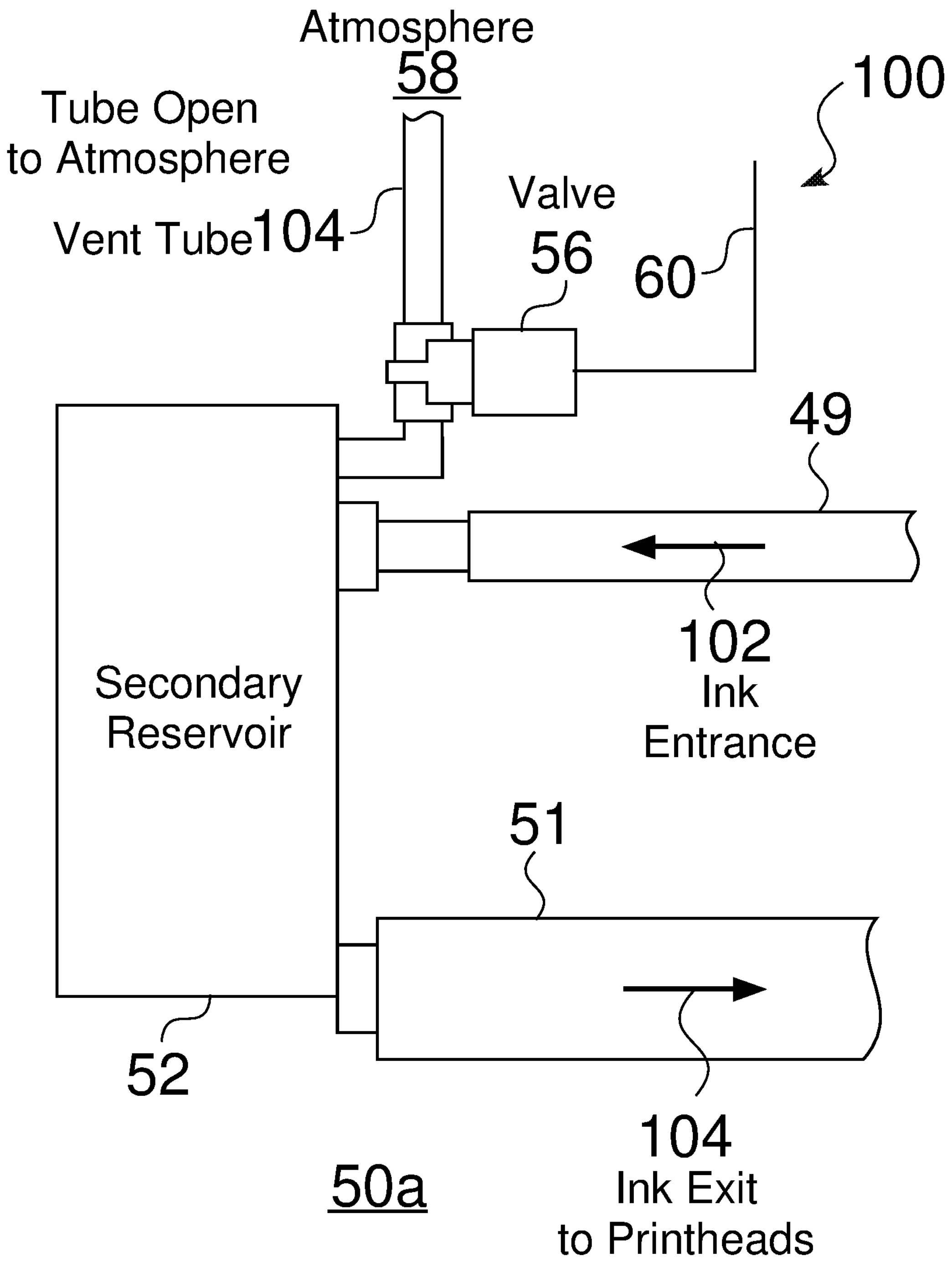
FIG. 3 is a partial view of components used for of an illustrative embodiment of a high stability ink delivery system.

FIG. 3 is a partial view 100 of components used for an illustrative embodiment of a high stability ink delivery system 50. A secondary reservoir 52 is located upstream of a printhead 24, wherein ink 16 can exit 104 from the secondary reservoir 52 to be delivered to the printhead 24. As also seen in FIG. 3, an ink supply conduit 49 is located upstream from the secondary reservoir 52, whereby ink 14 can enter 102 the secondary reservoir, through the ink supply conduit 49. In the illustrative high stability ink delivery system 50, e.g., 50*a*, seen in FIG. 3, a vent tube 106 is connected to the secondary reservoir 52, whereby the secondary reservoir 52 can be vented to atmosphere 58 when the valve 56 is in an open position, such as based on a control signal 60 received from a local controller 62 or a print system controller 34. For instance, the secondary reservoir 52 can be opened to the atmosphere through the valve 56, such as based on the reading of a pressure sensor 64 that is placed at a point before the printhead 24. In the illustrative high stability ink delivery system 50*a* seen in FIG. 3, the valve 56 can open the secondary reservoir 52 to the atmosphere 58, when the ink supply line pressure, as sensed by the pressure sensor 64, indicates that the secondary reservoir 52 can be open while avoiding air aspiration, and can close the valve 56 when this condition is not satisfied.

One of the advantages of this mode of operation is that the high stability ink delivery system 50 can readily be configured work with positive and/or negative pressure values before the printhead 24, thereby allowing a wide range of recirculation flow rate and/or meniscus pressure values to be defined.

For instance, under normal conditions, a pressure setpoint 67 can be established for the pressure as measured by the pressure sensor 64 that is located before the printhead 24, i.e., upstream of the printhead 24, wherein the pressure setpoint 67 ensures that the reservoir 56 can controllably be opened to the atmosphere 58, as defined by the control system 62,34 that governs the pumps or actuators 48 and/or 68, in order to benefit from the superior stability achieved by the fact that the pressure before the printhead 24 is defined based on the hydrostatics in the secondary reservoir 52.

Figure 4:
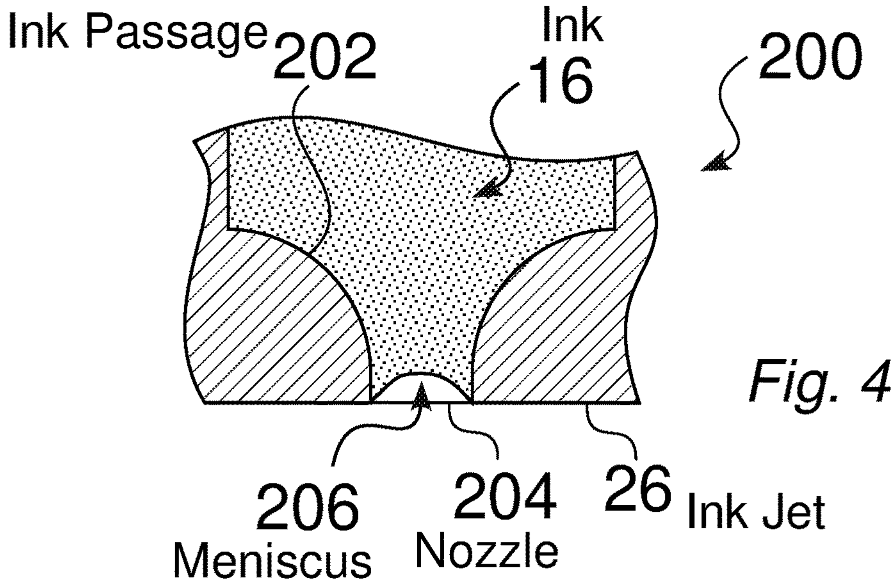
FIG. 4 is a partial cutaway view of an ink jet for a printhead for delivering inkjet ink, in which an ink meniscus is properly established at an inkjet nozzle.
Figure 5:
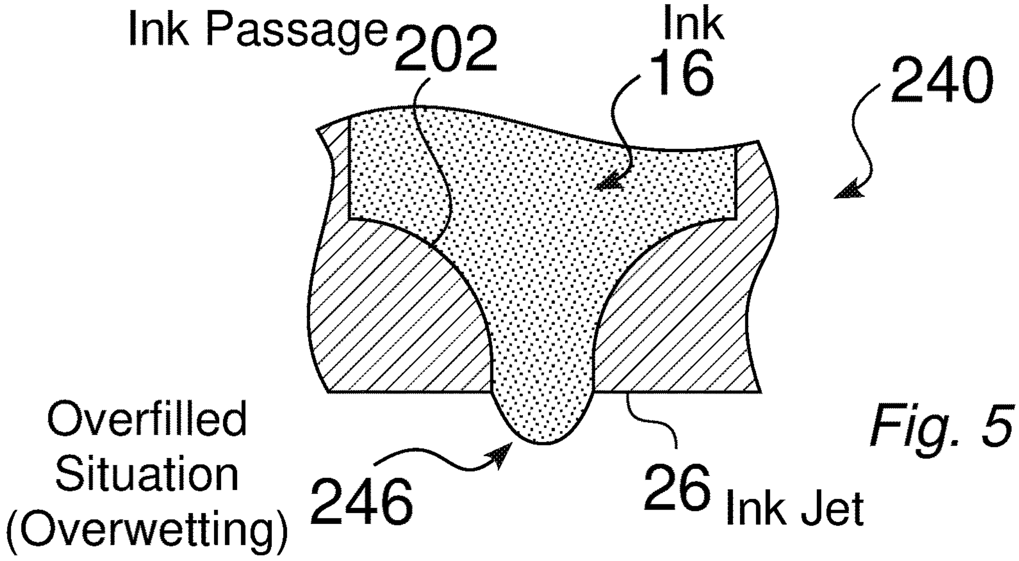
FIG. 5 is a partial cutaway view of an ink jet for a printhead for delivering inkjet ink, in which an overfill situation occurs at an inkjet nozzle.
Figure 6:
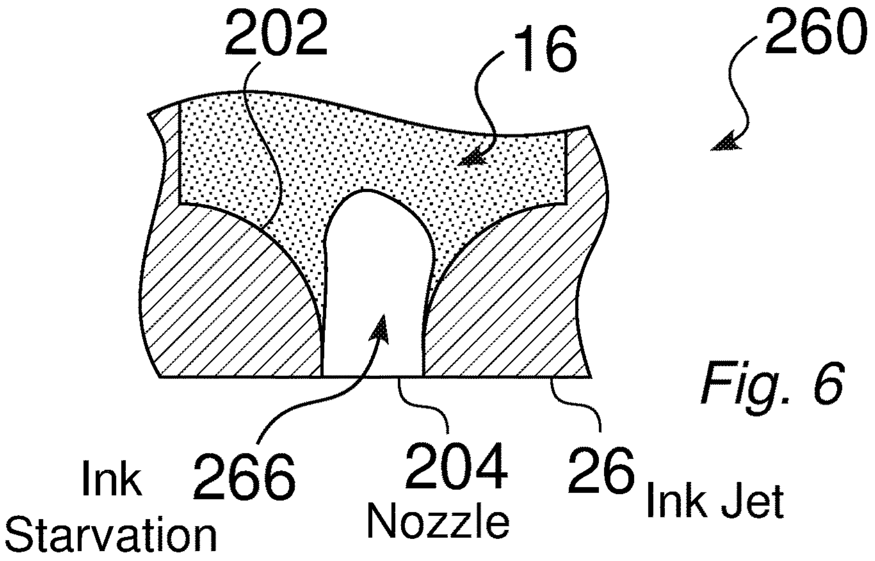
FIG. 6 is a partial cutaway view of an ink jet for a printhead for delivering ink, in which a starved/dry situation occurs at an inkjet nozzle.

FIG. 4 is a partial cutaway view 200 of an ink jet 26 for a printhead 24, for delivering ink 16, in which an ink meniscus 206 is properly established at an inkjet nozzle 204. FIG. 5 is a partial cutaway view 240 of an ink jet 26 for a printhead 24, for delivering ink 16, in which an overfill situation 246 occurs at an inkjet nozzle 204. FIG. 6 is a partial cutaway view 260 of an ink jet 26 for a printhead 24, for delivering ink 16, in which a starved/dry situation 266 occurs at an inkjet nozzle 204.

Figure 7:
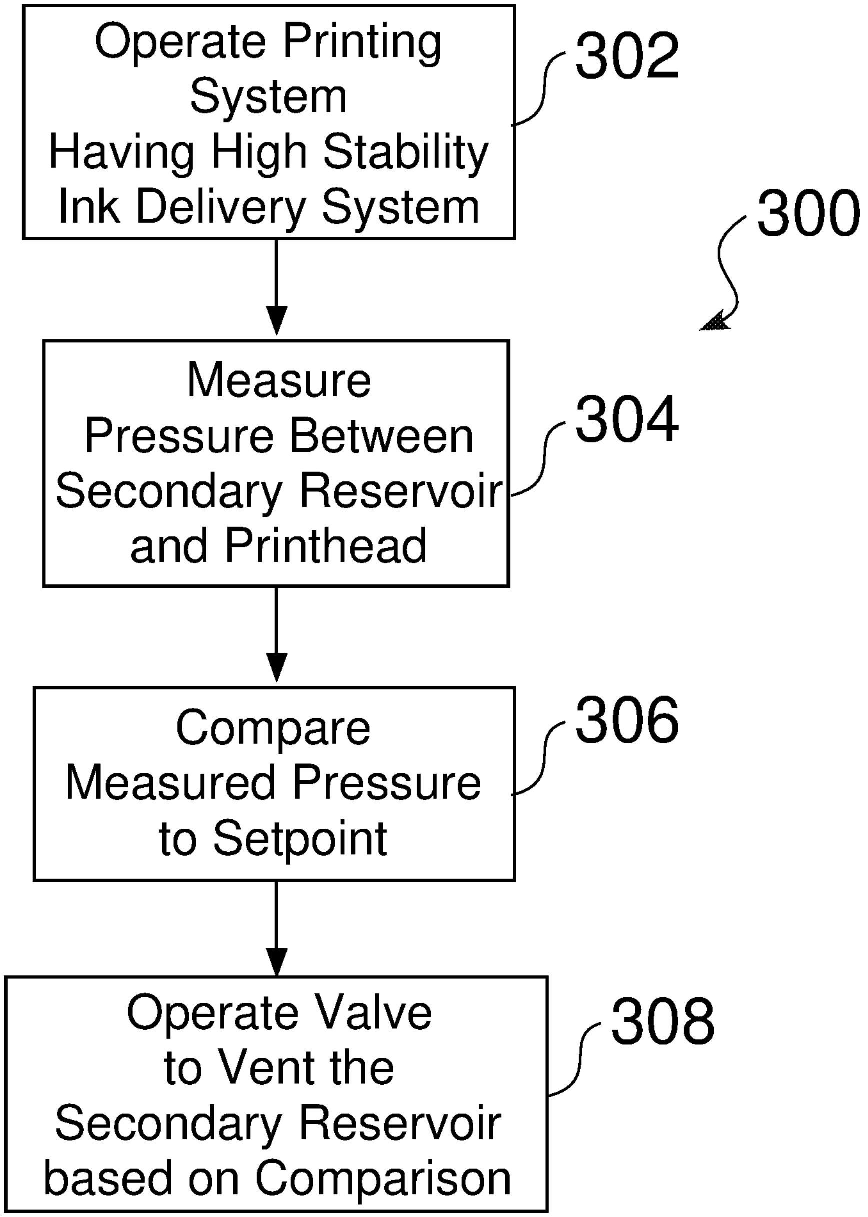
FIG. 7 is a flowchart showing operation of an illustrative embodiment of a high stability ink delivery system.

FIG. 7 is a flowchart showing operation 300 of an illustrative embodiment of a high stability ink delivery system 50. For instance, during operation 302 of a printing system 12 that includes a high stability ink delivery system 50, the pressure of the ink 16 between the secondary reservoir 52 and its corresponding printhead 24 is measured 304, such as by a pressure sensor 64, which sends an output signal 66 to a corresponding controller 62,34. The measured pressure 66 is then typically compared 306 to a setpoint, threshold or operating parameter 67, and based on this comparison, the valve 56 is operated 308 to promote stability of the ink delivery system. While the valve is generally disclosed as being controlled in an open or a closed position, some embodiments can be configured to throttle the opening of the vent, such as to improve the dynamic stability for a specific system configuration.

Figure 8:
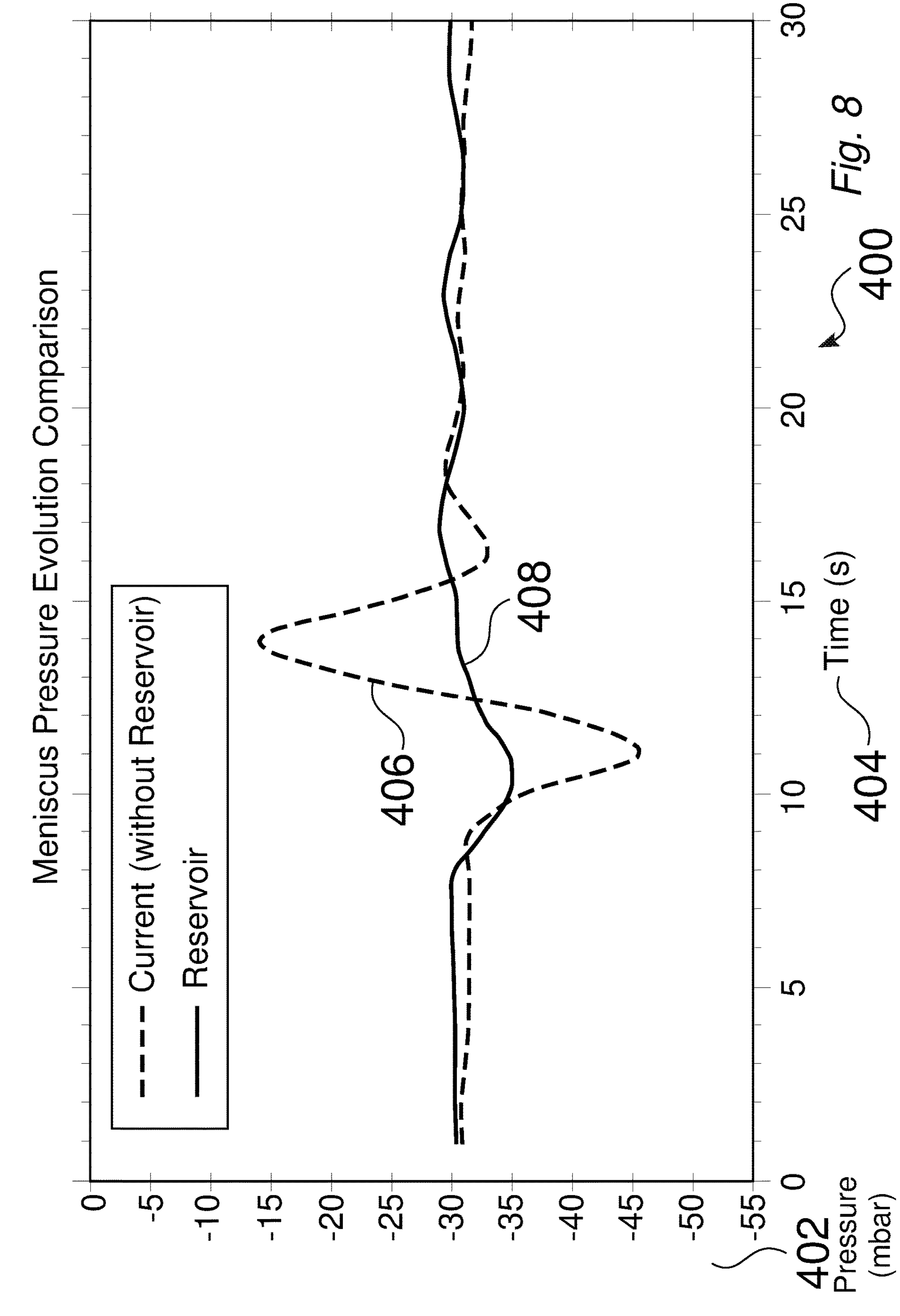
FIG. 8 is a chart showing a comparison of meniscus pressure evolution.

FIG. 8 is a chart 400 showing a comparison of meniscus pressure evolution, showing pressure (mbar) 402 as a function of time 404, in which a first graph 406 is shown for a current illustrative embodiment that does not include a secondary reservoir 52, and a second graph 408 that is shown for a similar illustrative embodiment that includes the high stability system 50 having a secondary reservoir 52. In these conditions, the improvement in terms of stability with respect to a system not based in hydrostatics in any way is significant as it can be observed in FIG. 8 for a single print in the same high discharge conditions.

As seen in FIG. 8, the perturbation of the meniscus pressure is reduced by a factor of about 4 to 5, effectively allowing higher discharge rates, while preventing ink starvation 266 (FIG. 6) or overfilling/dripping 246 (FIG. 5) due to this higher perturbation. This improvement can be achieved without the use of an additional actuator or pump, with respect to a baseline system. As such, the simplicity and lower cost of the original system not based of hydrostatics can be retained.

Figure 9:
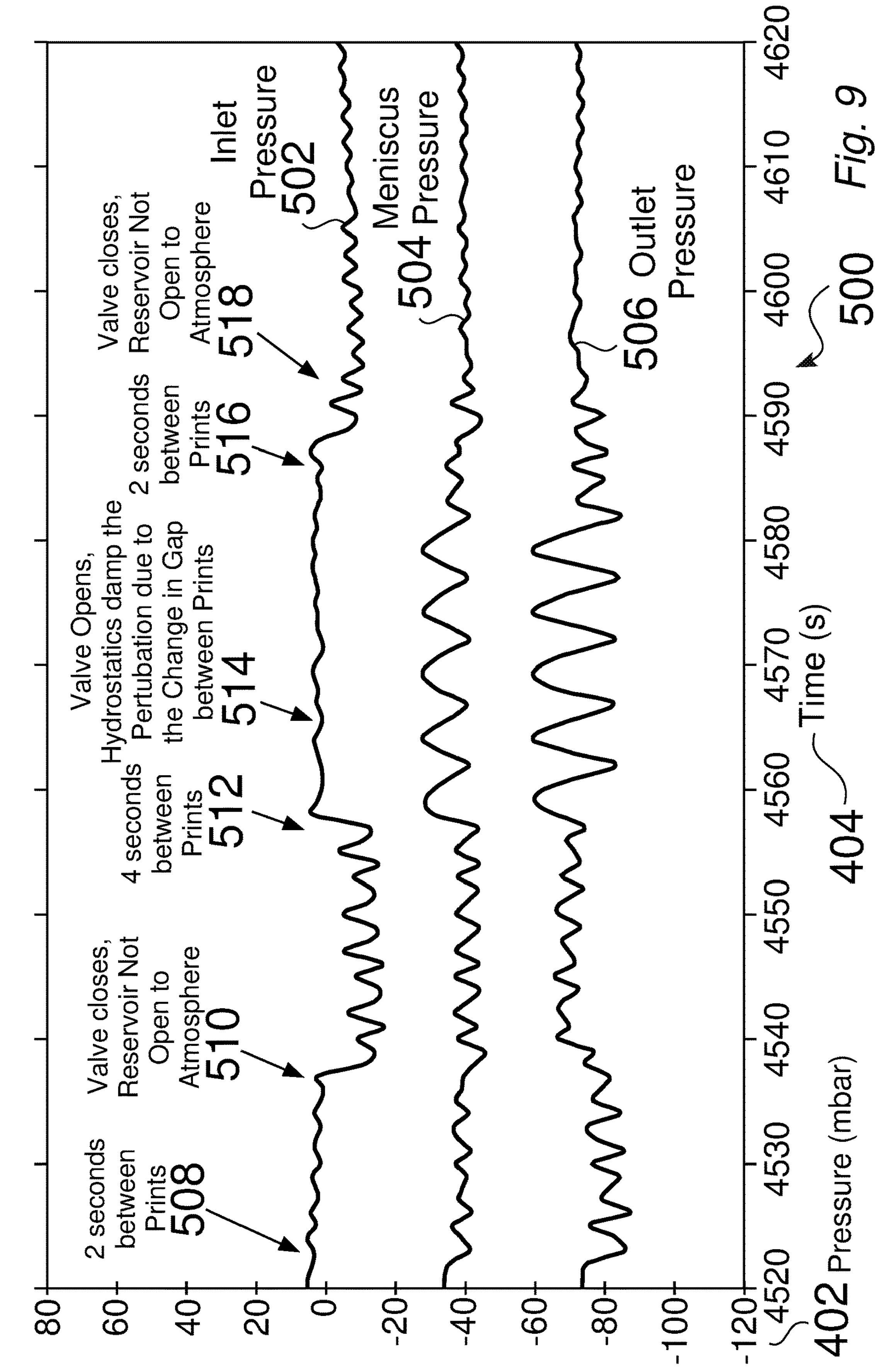
FIG. 9 is a chart showing pressure as a function of time.

FIG. 9 is a chart 500 showing pressure 402 as a function of time 404, including a first graph 502 showing pressure at the printhead inlet port 74 (FIG. 2), a second graph 504 showing meniscus pressure 76 (FIG. 2), and a third graph 506 showing pressure at the printhead outlet port 78 (FIG. 2). In some embodiments, the enhanced stability of the ink system 50 can retained if a pressure setpoint 67 (FIG. 3) before the printhead 24 that does not allow the secondary reservoir 52 to be open to the atmosphere 58 is defined, or if the dynamics of the printing process, such as including a distance between prints, print lengths, discharge rates, and/or other printing system parameters, makes the reading of the pressure sensor 64 to drop below the level that ensures that air aspiration through the secondary reservoir 52 will not take place. In those cases, the secondary reservoir 52 will not be open to the atmosphere 56, but if any subsequent print makes the pressure reading of the sensor 64 placed before the printhead 24 to go above the level that allows the opening of the secondary reservoir 52, the valve 56 can be instantly opened to the atmosphere 58, and heavily damp that oscillation through the action of hydrostatics, to prevent the meniscus pressure 76 to exceed the allowable limits. This can be observed in the FIG. 9, such as under a condition 508 where there is 2 seconds between successive prints, a condition 510 where the valve 56 closes so that the secondary reservoir 52 is not open to the atmosphere 58, a condition 512 when there is 4 seconds between successive prints, a condition 514 where the valve 56 is opened to the atmosphere, so that hydrostatics damp the perturbation, due to the change in gap between prints, a subsequent condition 516 where there is again 2 seconds between successive prints, and a condition 518 where the valve 56 is again closed so that the secondary reservoir 52 is not open to the atmosphere 58. Therefore, as seen in FIG. 9, the high stability ink delivery system 50 can quickly respond to different operating conditions.

Figure 10:
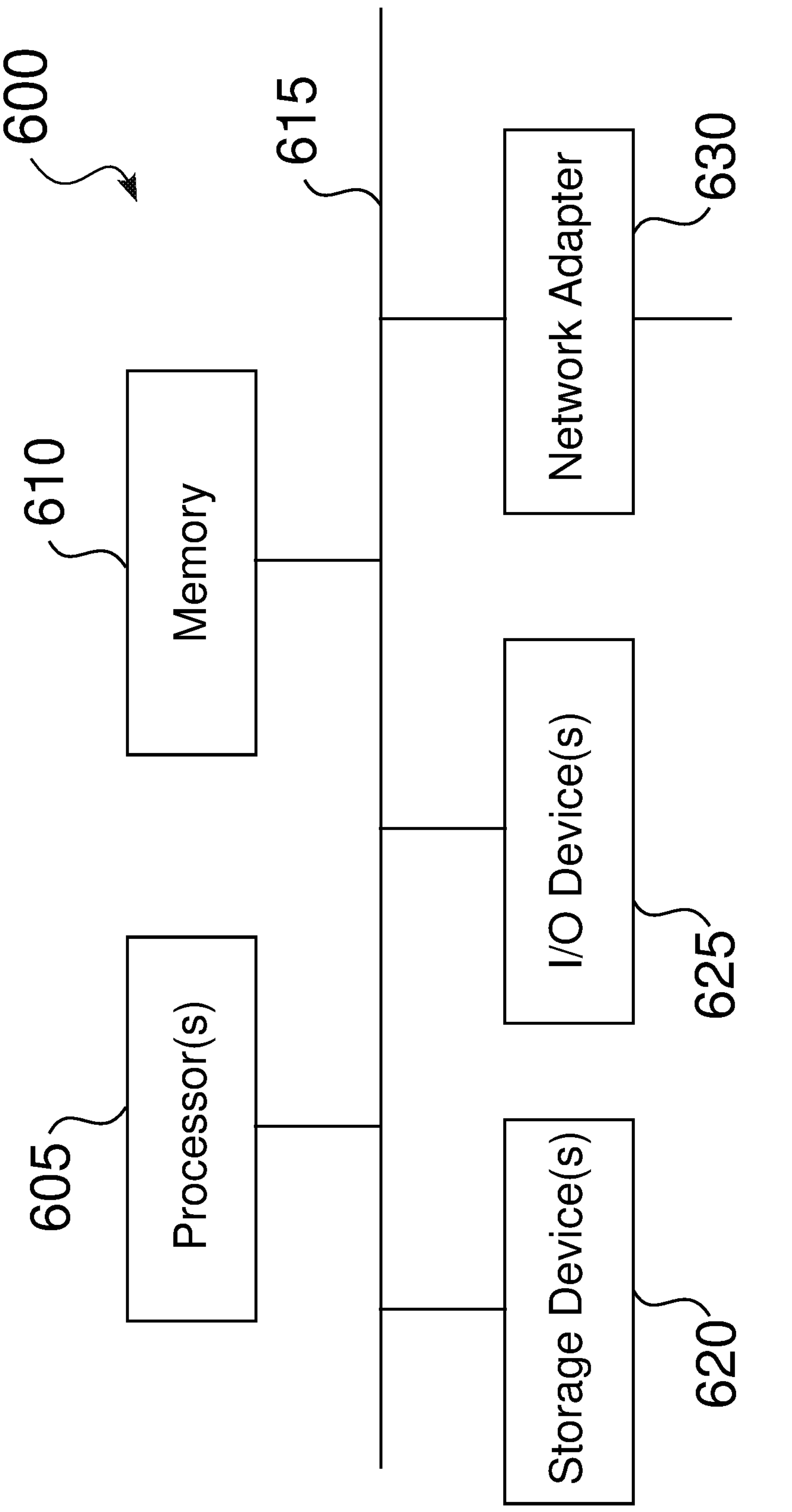
FIG. 10 is a high-level block diagram showing an example of a processing device that can represent any of the systems described herein.

FIG. 10 is a high-level block diagram showing an example of a processing device 600 that can be a part of any of the systems described above, such as the print system controller 34, or the local controller 62. Any of these systems may be or include two or more processing devices such as represented in FIG. 10, which may be coupled to each other via a network or multiple networks. In some embodiments, the illustrative processing device 600 seen in FIG. 10 can be embodied as a machine in the example form of a computer system within which a set of instructions for causing the machine to perform one or more of the methodologies discussed herein may be executed.

In the illustrated embodiment, the processing system 600 includes one or more processors 605, memory 610, a communication device and/or network adapter 630, and one or more storage devices 620 and/or input/output (I/O) devices 625, all coupled to each other through an interconnect 615. The interconnect 615 may be or include one or more conductive traces, buses, point-to-point connections, controllers, adapters and/or other conventional connection devices. The processor(s) 605 may be or include, for example, one or more general-purpose programmable microprocessors, microcontrollers, application specific integrated circuits (ASICs), programmable gate arrays, or the like, or a combination of such devices. The processor(s) 605 control the overall operation of the processing device 600. Memory 610 and/or 620 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 610 and/or 620 may store data and instructions that configure the processor(s) 605 to execute operations in accordance with the techniques described above. The communication device 630 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 625 can include devices such as a display (which may be a touch screen display), audio speaker, keyboard, mouse or other pointing device, microphone, camera, etc.

While the high stability ink delivery system 50 can readily be implemented for a wide variety of inkjet industrial printers 12, it should readily be understood that the delivery system 50 also be configured for other ink and fluid delivery systems.

This high stability ink delivery system 50 makes possible the introduction of robust high discharge solutions in current single-pass printer platforms with minimal modifications of the ink delivery system and minimal cost and complexity increase. As a result of this, a wide variety of printers related to inkjet printing can benefit from such systems and methods for their use, such as for digital application of coating and varnish, texturing and additive manufacturing.

Unless contrary to physical possibility, it is envisioned that (i) the methods/steps described above may be performed in any sequence and/or in any combination, and that (ii) the components of respective embodiments may be combined in any manner.

The ink delivery system and printer system techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g., read-only memory (ROM); random access memory (RAM); magnetic disk storage media; optical storage media; flash memory devices; etc.

Those skilled in the art will appreciate that actual data structures used to store this information may differ from the figures and/or tables shown, in that they, for example, may be organized in a different manner; may contain more or less information than shown; may be compressed, scrambled and/or encrypted; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for operating a printing system that includes (i) a primary ink reservoir, (ii) a secondary ink reservoir that is connected to the primary ink reservoir via a first ink delivery conduit, through which ink moves from the primary ink reservoir to the secondary ink reservoir, (iii) a printhead, and (iv) a pressure sensor that is positioned on a second ink delivery conduit, through which ink moves from the secondary ink reservoir to the printhead, the method comprising:

comparing a signal output by the pressure sensor to a threshold in a dynamic manner; and operating, based on an outcome of said comparing, a valve such that:

the valve is opened, allowing the secondary ink reservoir to be open to atmosphere, in response to a determination that pressure of the second ink delivery conduit meets the threshold, and the valve remains closed in response to a determination that the pressure of the second ink delivery conduit does not meet the threshold.

2. The method of claim 1, further comprising:

operating the valve in a controlled manner to prevent or reduce overfilling, over wetting, or starvation of ink at the printhead.

3. The method of claim 1, wherein said operating is further based on whether the pressure of the second ink delivery conduit indicates that the secondary ink reservoir can be open while avoiding air aspiration.

4. The method of claim 3, wherein the valve remains closed, even if the pressure of the second ink delivery conduit meets the threshold, if the pressure of the second ink delivery conduit indicates that air aspiration is likely to occur should the secondary ink reservoir be opened to atmosphere.

5. The method of claim 3, wherein to increase the pressure of the second ink delivery conduit to ensure that air aspiration does not occur, a parameter of a printing process is manipulated.

6. The method of claim 5, wherein the parameter is a distance or a time between prints, a print length, or a discharge rate.

7. The method of claim 1, wherein said operating further controls a pressure of a meniscus formed at a nozzle of the printhead, so as to prevent the pressure of the meniscus from exceeding an allowable limit.

8. The method of claim 7, wherein said operating causes the pressure of the meniscus to remain within a stable range.

9. The method of claim 8, wherein the stable range is −25 to −35 mbar.

10. The method of claim 7, wherein said operating causes the meniscus to have a concave form at the nozzle of the printhead.

11. A non-transitory medium with instructions stored thereon that, when executed by a processor, cause the processor to perform operations comprising:

obtaining a signal output by a pressure sensor that is situated along a first ink delivery conduit via which ink moves from a first ink reservoir to a printhead of a printer, wherein the first ink reservoir is connected to a second ink reservoir via a second ink delivery conduit, through which ink moves from the second ink reservoir to the first ink reservoir;

comparing, in response to said obtaining, the signal to a threshold; and controlling, in response to said comparing, a valve connected to the first ink reservoir such that:

the valve is opened, allowing the first ink reservoir to be open to atmosphere, in response to a determination that pressure of the first ink delivery conduit meets the threshold, and the valve remains closed in response to a determination that the pressure of the first ink delivery conduit does not meet the threshold.

12. The non-transitory medium of claim 11, wherein the processor is in the printer.

13. The non-transitory medium of claim 11, wherein the pressure sensor is situated proximate an inlet port of the printhead, such that through said controlling, a pressure of a meniscus formed at a nozzle of the printhead is maintained within a range.

* * * * *